United States Patent [19]

Delloye et al.

[11] Patent Number: 5,403,565

[45] Date of Patent: Apr. 4, 1995

[54] THORIUM PHOSPHATES PREPARED BY INSOLUBILIZATION OF SOLUBLE THORIUM COMPOUNDS

[75] Inventors: Thierry Delloye, Perigny; Jean-Luc Le Loarer, Salindres; Alain Leveque, La Rochelle, all of France

[73] Assignee: Rhone-Poulenc Chimie, Courbevoie Cedex, France

[21] Appl. No.: 137,746

[22] Filed: Oct. 19, 1993

[30] Foreign Application Priority Data

Oct. 19, 1992 [FR] France .................. 92 12463

[51] Int. Cl.$^6$ .................................... C01F 13/00
[52] U.S. Cl. ................................ 423/2; 423/3; 423/11; 423/157.5; 252/625
[58] Field of Search ............. 423/2, 3, 11, 157.5; 252/625

[56] References Cited

U.S. PATENT DOCUMENTS

| | | | |
|---|---|---|---|
| 3,351,436 | 11/1967 | Sarver | 23/345 |
| 3,764,553 | 10/1973 | Kirby | 252/301.1 R |
| 4,072,605 | 2/1978 | Thelander | 210/50 |
| 4,230,500 | 10/1980 | Balducci et al. | 106/288 B |
| 4,321,158 | 3/1982 | Beall et al. | 252/628 |
| 4,461,748 | 7/1984 | Sabot et al. | 423/10 |
| 4,528,129 | 7/1985 | Manchak | 252/628 |
| 4,726,938 | 2/1988 | Rollat et al. | 423/21.5 |
| 4,954,293 | 9/1990 | Cailly et al. | 252/625 |
| 5,045,289 | 9/1991 | Fernando et al. | 423/21.1 |
| 5,200,378 | 4/1993 | Clearfield | 502/62 |

FOREIGN PATENT DOCUMENTS 2135699 2/1972 Germany.

Primary Examiner—Donald P. Walsh
Assistant Examiner—Meena Chelliah
Attorney, Agent, or Firm—Burns, Doane, Swecker & Mathis

[57] ABSTRACT

Environmental pollution stemming from the industrial discharge and/or storage of water-soluble thorium compounds is avoided by converting same into essentially innocuous water-insoluble thorium phosphates, notably orthorhombic thorium phosphates, by (i) reacting such water-soluble thorium compounds, e.g., the nitrates and/or chlorides, with a base, for example aqueous ammonia, in an aqueous reaction medium, to precipitate a thorium hydroxide therein, (ii) next reacting the precipitate thus formed with a phosphating compound, e.g., phosphoric acid or a soluble phosphate salt, also in an aqueous reaction medium, to precipitate a thorium phosphate therein, and then (iii) separating such thorium phosphate precipitate.

21 Claims, 1 Drawing Sheet

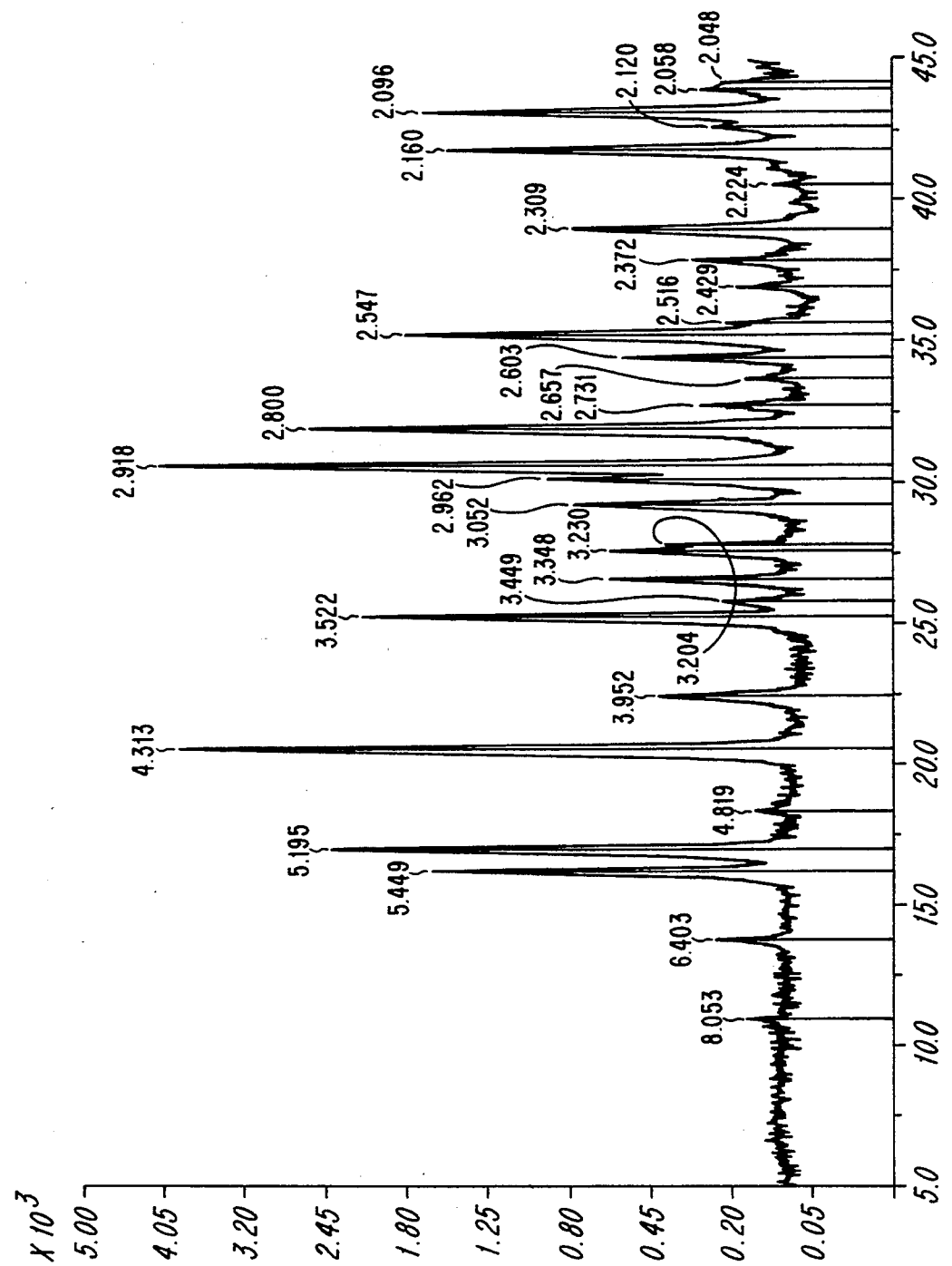

THORIUM PHOSPHATES PREPARED BY INSOLUBILIZATION OF SOLUBLE THORIUM COMPOUNDS

BACKGROUND OF THE INVENTION

1. Field of the Invention

The present invention relates to an industrial scale treatment of soluble thorium compounds to convert same into a thorium phosphate that is both insoluble and non-leachable, with a view to controlling polluting problems related to discharges and/or storage of thorium products and other radioactive materials.

2. Description of the Prior Art

It is known to this art that certain industries, in particular those which are based on the hydro-metallurgical treatments of ores, can produce, when the treated ores contain, inter alia, thorium (monazite, uranothioranite, for example), various natural thorium salts, such as, generally, the chlorides or nitrates which are highly soluble in water.

Taking account, in particular, of their intrinsic radioactivity, these thorium salts have, unfortunately, to date been used only sparingly. Consequently, and while awaiting future potential outlets for thorium, the current production surpluses, taken as a whole, amount to simple byproducts which today have no added value and which are stored with the greatest care and at great expense, to prevent any harm to man and/or the environment. In this respect, it should be noted that, in terms of radiotoxicity, thorium-232, which is the parent radioisotope of the thorium family, is currently subjected to health standards, especially at the level of its presence in water, which are extremely strict and severe.

From this fact, the present inventors reasoned that the above problems, especially storage, could indeed be limited, and even removed, if it were possible to convert all of the thorium values, initially present in the form of one of its soluble salts, for example, in effluents, residues, wastes and similar materials, into a final compound which is as insoluble and as non-leachable as possible, namely, into a form which is completely inert, in particular to the environment. Not only the effluent generated by the insolubilization operation would thus be freed of the undesirable thorium values and could then optionally be enhanced in value, but, additionally, the recovery of the thorium would then be carried out in a directly storable form and in a reliable and economic manner.

Given that the complete insolubilization of the thorium constituted a necessary precondition to attain storage which is both economic and which has, on a long term basis, no noxious or harmful impact on the environment, the present inventors then considered insoluble compounds of the thorium phosphate type. Indeed, these compounds have been shown to be the thorium salts which have the weakest solubilities. Consequently, to succeed in perfectly controlling, on an industrial scale the synthesis of thorium phosphates from soluble thorium compounds it would be required to simultaneously provide (i) effluents which have been freed of this species, and thus potentially added in value, (ii) for the storage of thorium in its most insoluble, and thereby most inert, form and, finally, optionally, (iii) for the use of the phosphates thus prepared as a coating and/or protective material for storing other radioactive wastes.

It will be appreciated that processes for the preparation of compounds of the thorium phosphate type are known to this art. Thus, it is known that such compounds can be obtained by direct reaction between, on the one hand, a solution of a soluble thorium salt (nitrate, chloride) and, on the other, an alkali metal phosphate or phosphoric acid (see, especially, Paul Pascal, *Nouveau Traite de Chimie Minerale* [New Treatise on Organic Chemistry], Volume IX, page 1132 et seq (1963)). However, in all cases, gels are produced which are extremely difficult, indeed impossible, to filter. Consequently, such synthetic routes cannot be used on a truly industrial scale.

SUMMARY OF THE INVENTION

Accordingly, a major object of the present invention is the provision of an improved process for the treatment of soluble thorium compounds to avoid or ameliorate the above disadvantages and drawbacks to date characterizing the state of this art, such process comprising:

(i) first reacting said soluble thorium compounds, in aqueous medium, with a base to thus precipitate a thorium hydroxide;

(ii) next reacting the precipitate thus formed, still in aqueous medium, with a compound that releases phosphate ions, to provide a thorium phosphate precipitate; and (iii) separating the thorium phosphate precipitate thus obtained from the medium of precipitation.

DETAILED DESCRIPTION OF PREFERRED EMBODIMENTS OF THE INVENTION

More particularly according to the present invention, the following numerous advantages are thus provided:

(1) first, thorough insolubilization of thorium-232 and of its daughter products, in particular radium-228 is attained, providing effluents which have been highly purified from radioactivity, especially with respect to current health standards; in addition, an optional subsequent enhancement in value of such effluents is possible (in the case of formation of ammonium nitrate, for example);

(2) the final thorium phosphate precipitate then filters very well, an extremely important property, permitting the process to be operated viably on an industrial scale, in particular if a process is intended which operates continuously and/or which removes, by washing, certain soluble components which are harmful to the environment (the case of nitrates, for example);

(3) additionally, the radionucleides contained in this precipitate are leached at an extremely low rate, which is a measure of guarantee for lasting and very long term storage of the products (to avoid, in particular, their leaching by, for example, surface waters); and (4) finally, it provides a novel thorium phosphate, corresponding to the formula $Th_3(PO_4)_4$ but having a crystalline phase which is not known to this art and/or published and/or indexed. The X-ray diffraction spectrum of this new phase is shown in the FIGURE of Drawing. It is a structure of orthorhombic type.

By the term "soluble thorium compounds" are intended compounds which are soluble in water. Exemplary of such are, in particular, the nitrates, sulfates, halides and, especially, the chlorides. The soluble thorium salts which are the most commonly encountered in industrial production are the nitrates and chlorides, which thus constitute starting materials of choice for carrying out the process according to the invention.

It will of course be appreciated that it is thus envisaged to treat either crude industrial aqueous streams already containing these soluble compounds in the dissolved form (direct treatment) or solutions which are obtained by prior dissolution in water of said compounds initially in the solid state (synthesis solutions).

In the first step of the process according to the invention, a solution of a soluble thorium compound is reacted with a base. By "base" is intended a compound that releases hydroxide ions OH⁻ to form, under the conditions of the reaction, a thorium hydroxide precipitate. Particularly exemplary such bases include aqueous ammonia and alkali metal hydroxides, in particular sodium hydroxide or potassium hydroxide. Aqueous ammonia is particularly well suited and is the preferred base; thus, when a thorium nitrate solution is treated with the latter, the byproduct obtained is then ammonium nitrate.

The reaction between the thorium compound and the base is preferably carried out while maintaining the pH of the precipitation medium constant, or substantially constant By "constant pH," or "substantially constant pH," is intended control of the pH at more or less one pH unit around the fixed set value. It has been found that the optimum working range, at the pH level, ranges from 4 to 8, for a reaction temperature corresponding to room temperature (18°–25° C.). A practical way to carry out the reaction comprises, for example, continuously introducing the solution containing the thorium salts, on the one hand, and a base solution, on the other, into a reactor, while maintaining the ratio between the flow rates of the reactant flows constant. The temperature of the reaction medium is not critical. The reaction is carried out until the thorium has completely precipitated.

At the conclusion of this first step, a second compound containing phosphate ions (phosphating agent) is then introduced into the suspension containing the precipitate, to precipitate the thorium phosphate. Exemplary compounds containing phosphate ions include, in particular, either phosphoric acid, or a soluble phosphate salt, or a mixture thereof. The soluble phosphate salts which are the preferred are alkali metal, especially sodium, phosphates and ammonium phosphate.

It will be appreciated that, instead of introducing the phosphating agent directly into the precipitation medium resulting from step (i), it is equally intended to first separate the precipitate based on thorium hydroxide and then to react the latter with the phosphating agent. This latter embodiment for carrying out the reaction is simply more complicated, provides no specific advantages at the level of the final product, and, for these reasons, is not preferred.

As was the case in the first step of the process according to the invention, this second step is advantageously carried out while controlling the pH of the precipitation medium. The best results are then obtained while maintaining the pH at a constant, or substantially constant, value which is greater than 5.

The temperature at which this reaction is carried out is not critical and typically is in the vicinity of room temperature (18° C. to 25° C.).

The thorium phosphate produced in this second stage is then easily separated from the resulting suspension, especially by filtration, or any other separation technique such as settling, draining or centrifuging, for example. Preferably, a single filtration stage is employed. This latter characteristic indeed constitutes one of the principal advantages of the treatment process according to the invention. The product thus recovered can then optionally be washed and the salts contained in the mother liquors, which then have very low residual radioactivity, are added value compounds.

The recovered thorium phosphate can then be optionally calcined and then shaped, these operations not at all adversely affecting the excellent leaching characteristics of the original product.

Thus, the present invention also features such thorium phosphate, per se, notably that produced using phosphoric acid as the phosphating agent. As indicated above, this thorium phosphate would appear to overall correspond to the known general theoretical formula $Th_3(PO_4)_4$. After calcination carried out at a temperature greater than 800° C., it nonetheless exists in the form of a crystalline phase of orthorhombic type, currently unknown to this art, or at least not yet reported in the standard crystallography catalogs (especially ASTM). The X-ray diffraction spectrum of the product according to the invention, after calcination at 900° C., is shown in the Figure of Drawing. This product is very insoluble and has a very low rate of leaching.

In order to further illustrate the present invention and the advantages thereof, the following specific examples are given, it being understood that same are intended only as illustrative and in nowise limitative.

In said examples, a specific configuration of apparatus was used, comprising two reactors arranged in series, the reactor No. 1 overflowing entirely into the reactor No. 2. The suspension produced in the reactor No. 2 was filtered. A filtration test (defined below) permitted characterization of its filterability. The mother liquors collected were analyzed. The filtered solid (pure or complex thorium phosphate) was characterized by a standard leaching test (AFNOR standard D 31-210).

Definition of the Filterability Test

The filterability measurement was carried out using 100 ml of suspension under a vacuum of 600 mm of mercury. The filtration cell was equipped with a 0.45 micron Millipore filter. The filtration surface area was 13.2 cm². The filtrate was recovered in a graduated test tube. The filterability F is expressed in ml/cm²/h according to the relationship:

$$F = \frac{V \times 3600}{t \times s}$$

in which V is the filtrate volume in ml; S is the filtration surface area in cm²; and t is the filtration time in seconds.

EXAMPLE 1

This example illustrates the use of aqueous ammonia as the base in reactor No. 1 and of trisodium phosphate as the phosphating agent in reactor No. 42.

The reactor No. 1 was continuously supplied with the following two feedstreams:
  (i) a thorium nitrate solution having a concentration of 0.265 mol/liter and additionally containing 62,200 Bq/1 of radium-228, the flow rate of introduction of this solution being constant and set at 0.55 1/hour (flow No. 1);

(ii) an aqueous ammonia solution having a concentration of 6N, with a constant flow rate of introduction set at 0.097 1/h (flow No. 2).

The pH was maintained constantly equal to 6 in the reactor No. 1 and the mean residence time of the products in this reactor was on the order of 30 minutes.

The reactor No. 2 was supplied, on the one hand, with the overflow from the reactor No. 1 above and, on the other, with a third flow of a trisodium phosphate solution having a concentration of 0.5 mol/liter introduced at a constant flow rate of 0.53 1/h (flow No. 3).

The pH in this second reactor was equal to 10.1 and the mean residence time of the products on the order of 30 minutes.

The various results obtained were the following:

1. Analysis of the mother liquors (liquid flow exiting from the reactor No. 2 after filtration of the precipitate) evidenced a thorium content, expressed in the $ThO_2$ form, below 0.1 mg/liter, equivalent to an insolubilization yield of the thorium greater than 99.999%. Additionally, the radium-228 content in these mother liquors was 1.3 Bq/l, or an insolubilization yield of this species greater than 99.99%;

2. The precipitate formed in reactor No. 2 (obtained in a yield of 48.1 g/hour as dry solids) had, after filtration, washing with water and then drying, the following composition by weight:
Th: 70%; P: 7.7%; Na: 1.9%; O: 20.4%;

3. The filterability of the pulp exiting the reactor No. 2 was equal to 1,260 ml/cm$^2$/h (measured under a vacuum of 500 mm Hg and using a 0.45 micron filter). In comparison, the precipitation of a phosphate obtained by direct reaction of a trisodium phosphate solution (0.53 mol/l; 0.53 1/h) with a thorium nitrate solution (0.265 mol/l; 0.55 1/h) produced a pulp whose filterability was less than 20 ml/cm$^2$/h;

4. The thorium phosphate precipitate obtained in the reactor No. 2 was, after filtration and then washing with water on the filter, subjected to a leaching test according to AFNOR standard X 31-210. Analysis of the first leachate then provided the following results:
(a) the thorium concentration, expressed in the $ThO_2$ form, was 0.85 mg/l, i.e., a dissolved fraction of less than $2.0 \cdot 10^{-3}$%;
(b) the radium-228 concentration was, in turn, less than 1 Bq/l, i.e., a dissolved fraction of less than $3.0 \cdot 10^{-3}$%.

EXAMPLE 2

This example illustrates the use of aqueous ammonia as the base in reactor No. 1 and of phosphoric acid as the phosphating agent in reactor No. 2.

The reactor No. 1 was continuously supplied with the following two feedstreams:
(i) a thorium nitrate solution having a concentration of 0.568 mol/liter and additionally containing 84,640 Bq/l of radium-228, the flow rate of introduction of this solution being constant and set at 0.47 1/h (flow no. 1);
(ii) an aqueous ammonia solution having a concentration of 6.2N, with a constant flow rate of introduction set at 0.068 1/h (flow No. 2).

The pH was maintained at 6 in reactor No. 1 and the mean residence time of the products in this reactor was on the order of 30 minutes.

The reactor No. 2 was supplied, on the one hand, with the overflow from reactor No. 1 and, on the other, with the following two flows:
(iii) a phosphoric acid solution having a concentration equal to 7.3 mol/liter, with a constant flow rate of introduction set at 0.054 1/h (flow No. 3);
(iv) an aqueous ammonia solution having a concentration of 6.2N, with a constant flow rate of introduction set at 0.088 1/h (flow No. 4).

The pH in the reactor No. 2 was thus adjusted to a value around 6.5 and the mean residence time of the products in this reactor was on the order of 30 minutes.

Following the procedures of Example 1 above, the results obtained were:

1. Analysis of the Mother Liquors
[$ThO_2$] < 0.1 mg/l, i.e., an insolubilization yield of thorium greater than 99.999%;
[Ra-228] = 8 Bq/l, i.e., an insolubilization yield of this species greater than 99.98%.

2. Analysis of the Precipitate Obtained in Reactor No. 2

A product was obtained (with a formation yield of 95.1 g/h as dry solids) which had, after filtration, washing with water and then drying, the following composition by weight:
Th: 64.7%; P: 11.5%; O: 23.8% corresponding to the thorium phosphate of the formula $Th_3(PO_4)_3$.

3. Filterability of the Pulp Exiting the Reactor No. 2

The filterability, measured as in Example 1, was 600 ml/cm$^2$/h.

In comparison, the precipitation of a phosphate obtained by the direct reaction of a phosphoric acid solution (7.3 mol/l, 0.054 1/h) and an aqueous ammonia solution (6.2N, 0.156 1/h) with a thorium nitrate solution (0.568 mol/liter, 0.47 1/h) provided a pulp whose filterability was less than 20 ml/cm$^2$/h.

4. Leachability of the Thorium Posphate Obtained

The test was carried out as in Example 1.

Analysis of the first leachate then provided the following results:
(a) [$ThO_2$] < 0.1 mg/l, i.e., a dissolved fraction less than $3.0 \cdot 10^{-4}$%;
(b) [Ra-228] = 0.5 Bq/l, i.e., a dissolved fraction less than $2.0 \cdot 10^{-3}$%.

EXAMPLE 3

The thorium phosphate recovered after filtration in Example 2 was washed with water and then calcined at 900° C. for 2 hours.

The X-ray diffraction spectrum of the thorium phosphate thus calcined is shown in the Figure of Drawing. It did not correspond to any of the thorium phosphate phases listed to date.

The leaching test carried out on this calcined phosphate gave the following analytical results (on the first leachate):
(a) [$ThO_2$] < 0.1 mg/l, i.e., a dissolved fraction less than $3.0 \cdot 0^{-4}$%;
(b) [Ra-228] = 1 Bq/l, i.e., a dissolved fraction less than $4.0 \cdot 10^{-3}$%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a precipitate which forms via calcination a water-insoluble orthorhombic thorium phosphate, comprising (i) reacting a water-soluble thorium compound with a base, in an aqueous reaction medium, to precipitate a thorium hydroxide therein, (ii) next reacting the precipitate thus formed with a phosphating compound, also in an aqueous reaction medium, to precipitate a thorium phosphate therein, and (iii) separating said thorium phosphate precipitate.

2. The process as defined by claim 1, said base comprising aqueous ammonia, an alkali metal hydroxide, or admixture thereof.

3. The process as defined by claim 2, said base comprising aqueous ammonia.

4. The process as defined by claim 1, said phosphating compound comprising phosphoric acid, a soluble phosphate salt, or admixture thereof.

5. The process as defined by claim 4, said phosphating compound comprising an alkali metal phosphate, ammonium phosphate, or admixture thereof.

6. The process as defined by claim 1, said soluble thorium compound comprising a nitrate, sulfate, halide, or admixture thereof.

7. The process as defined by claim 6, said soluble thorium compound comprising a thorium nitrate and/or chloride.

8. The process as defined by claim 1, comprising conducting step (i) at a constant, or substantially constant, pH value ranging from 4 to 8.

9. The process as defined by claim 1, comprising conducting step (ii) at a constant, or substantially constant, pH value greater than 5.

10. The process as defined by claim 1, comprising (iii) filtering said thorium phosphate precipitate.

11. The process as defined by claim 1, further comprising washing the step (iii) thorium phosphate precipitate.

12. The process as defined by claim 1, further comprising calcining the step (iii) thorium phosphate precipitate.

13. The thorium phosphate product of the process as defined by claim 1.

14. Water-insoluble, orthorhombic thorium phosphate, $Th_3(PO_4)_4$.

15. The thorium phosphate as defined by claim 14, having the X-ray diffraction pattern shown in the Figure of Drawing.

16. The thorium phosphate as defined by claim 14, further comprising radium values.

17. The thorium phosphate as defined by claim 16, comprising radium-228 values.

18. A radioactive substrate coated with the thorium phosphate as defined by claim 14.

19. The process as defined by claim 1, the separating step consisting essentially of a single filtration step.

20. The process as defined by claim 1, further comprising calcining the thorium phosphate precipitate and forming orthorhombic $Th_3(PO_4)_4$.

21. The process as defined by claim 1, the hydroxide precipitated in step (i) consisting essentially of thorium hydroxide.

* * * * *